United States Patent [19]

Young

[11] Patent Number: 4,459,207

[45] Date of Patent: Jul. 10, 1984

[54] METHOD AND APPARATUS FOR CLEANING DRILLING FLUIDS

[75] Inventor: Grant A. Young, Tulsa, Okla.

[73] Assignee: Standard Oil Company, Chicago, Ill.

[21] Appl. No.: 339,533

[22] Filed: Jan. 15, 1982

[51] Int. Cl.³ .............................. B07B 1/28; B07B 1/50
[52] U.S. Cl. ..................................... 209/269; 209/268;
209/380; 210/384; 175/206
[58] Field of Search ................... 209/1, 233, 44, 17,
209/250, 268, 269, 273, 380, 446, 448, 425–427,
455–457, 172.5, 211; 175/66, 206; 134/25.1;
210/384, 385, 785

[56] References Cited

U.S. PATENT DOCUMENTS

| | | | |
|---|---|---|---|
| 713,436 | 11/1902 | Hodge | 209/425 |
| 1,070,552 | 8/1913 | Steffy | 209/425 |
| 1,176,735 | 3/1916 | Conley | 209/446 X |
| 1,343,683 | 6/1920 | Rogers | 209/425 |
| 1,635,111 | 7/1927 | Burns | 209/425 |
| 2,048,923 | 7/1936 | Dodson | 209/269 X |
| 2,632,366 | 3/1953 | Ahlfors | 209/269 |
| 2,708,032 | 5/1955 | Heyman | 209/17 |
| 2,781,129 | 2/1957 | Remer | 209/455 |
| 2,919,898 | 8/1957 | Marwill et al. | 209/211 |
| 2,941,783 | 6/1960 | Stinson | 209/211 |
| 3,640,383 | 2/1972 | Wantling | 209/17 |
| 3,794,162 | 2/1974 | Miller et al. | 209/172.5 |
| 4,257,878 | 3/1981 | Fishback et al. | 209/17 X |

FOREIGN PATENT DOCUMENTS 825504 12/1959 United Kingdom ................. 209/17

Primary Examiner—Frank W. Lutter
Assistant Examiner—Wm. Bond
Attorney, Agent, or Firm—Scott H. Brown; Fred E. Hook

[57] ABSTRACT

Method and apparatus for making a sharp separation of solids into components which are finer than the screen mesh and coarser then the screen mesh. The solids ladened fluid is introduced onto a screen to separate coarse solids from fine solids. A tray containing a body of aqueous liquid is vibrated causing the aqueous liquid to repeatedly contact the solids while on the screen to provide the needed mobility for fine particles to pass through the screen with the liquid. The aqueous liquid returns to the tray and the vibration of the tray aids in removal of the fine solids which have passed through the screen from the tray. Aqueous liquid is continuously added to the tray or sprayed above the screen to keep accumulated solids from increasing the viscosity of the aqueous liquid in the tray.

4 Claims, 6 Drawing Figures

METHOD AND APPARATUS FOR CLEANING DRILLING FLUIDS

BACKGROUND OF THE INVENTION

1. Field of the Invention

The present invention relates to a method and apparatus for cleaning drilling fluids and, more particularly, to such a method and apparatus wherein drilled solids on a screen separation device are contacted with an aqueous liquid from a tray disposed adjacent the screen.

2. Setting of the Invention

In drilling a well by rotary drilling, drilling fluid is continuously circulated from the surface through the drill string, through the bit, and up the annulus between the drill stringing and the borehole to the surface. The drilling fluid lubricates and cools the bit while drilling and removes drilled solids from the borehole. For the drilling fluid to perform satisfactorily, the viscosity and density of the drilling fluid must be maintained within certain limits.

A problem encountered while drilling is controlling the amount of drilled solids in the drilling fluid. The drilled solids may be bit cuttings and certain formation material. If permitted to accumulate in the drilling fluid, these drilled solids increase the viscosity and density of the drilling fluid which reduces the lubricating and cooling capabilities of the fluid, as well as possibly damaging some of the drilling equipment.

After exiting the wellbore, the drilling fluid may be passed over a screen separation device, such as a shale shaker or the like to separate a major portion of the drilled solids from the drilling fluid. The drilled solids which do not pass through the screen of the shale shaker are discarded. The other components of the drilling fluid, including liquids and smaller drilled solids, which pass through the screen are either directly returned to the drilling fluid system or are passed to additional drilling fluid cleaning devices.

One such additional cleaning device is a mud cleaner which consists of a plurality of centrifugal separation devices, such as hydrocyclones, and a screen separation device. The centrifugal separation devices remove a majority of the liquid components of the drilling fluid, such as water, bentonite and other chemicals, and are directly returned to the drilling fluid system. The drilled solids and dense components exit from the centrifugal separation devices and are introduced onto the screen separation device. The drilled solids cannot pass through the screens and are discarded. The remaining components, including liquids and silt, may be returned to the drilling fluid system.

In the event that a weighted drilling fluid is utilized in drilling the well, a certain portion of the weighting material may be accidentally discarded with the drilled solids while being treated in the additional cleaning devices. The weighting material tends to adhere to the drilled solids and is difficult to be removed therefrom. Water jets have been tried in the past to direct a spray of water onto the drilled solids while on the screen to aid in the separation of the weighting material from the drilled solids. The weighting material and the water pass through the screens. Further, the water passes through the screen and may be returned to the drilling fluid system along with the weighting material. The use of water in this manner has numerous disadvantages, including the fact that the drilling fluid system may become diluted with water which requires the addition of drilling fluid components to maintain the required drilling fluid characteristics. Further, the use of large amounts of water in remote, arid drilling regions is severely restricted and costly.

SUMMARY OF THE INVENTION

The present invention provides a method and apparatus for cleaning a fluid having solids therein. The fluid is introduced onto a screen to separate the solids from the fluid. A body of liquid is contacted with the solids while on the screen to aid in the separation thereof and provide mobility for the solids capable of passing through the screen to do so. The liquid is contained in a tray and after contacting the solids on the screen is returned to the tray. The tray of liquid may be vibrated to cause the liquid to contact the solids on the screen. The vibration of the tray of liquid also causes the more dense material which has passed through the screen to separate from the liquid in the tray.

DESCRIPTION OF THE PREFERRED EMBODIMENTS

The present invention provides a method and apparatus to achieve better drilling fluid cleaning or separation of solids from the drilling fluid and to reduce the accidental loss of weighting material during this separation. In the present invention, a liquid contained in a tray is splashed or sprayed onto solids while on a screen. The liquid aids in the separation of the solids from the drilling fluid and provides mobility to pass the drilling fluid components through the screen and into the tray. The screen may be vibrated and the tray may be vibrated. The vibration of the tray causes the liquid to splash onto the solids on the screen and causes the more dense components of the drilling fluid to separate out from the less dense components while in the tray.

Drilling fluid will usually contain fluid components, such as water and various chemicals; a viscosifier, such as bentonite; and, if needed, a weighting material, such as barite.

Figure 1:
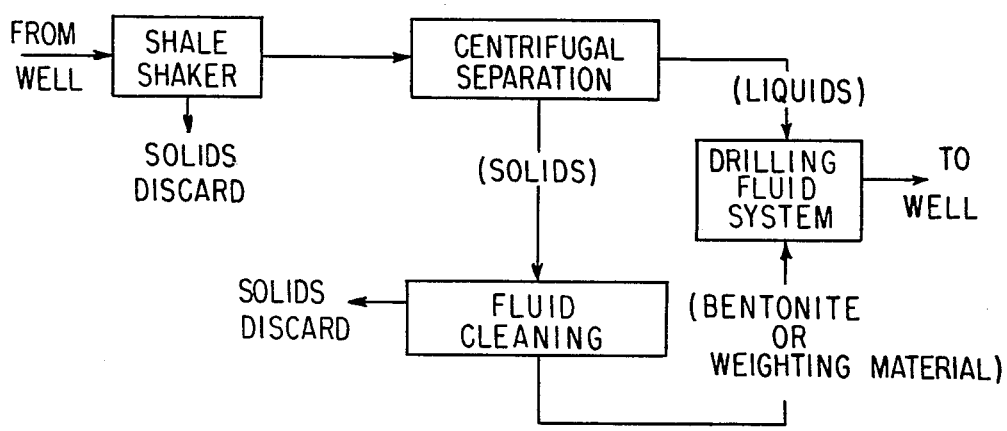
FIG. 1 is a flow diagram illustrating a drilling fluid system.

As shown in FIG. 1, within a drilling fluid cleaning system the drilling fluid with solids is passed through a shale shaker where a major portion of the solids are separated and discarded. The drilling fluid is then passed to a centrifugal separation device wherein the fluid components are separated and are returned to the drilling fluid system. The solids and dense components of the drilling fluid pass to a screen separation device. The separated solids are discarded and the remaining dense components are returned to the drilling fluid system.

Figure 2:
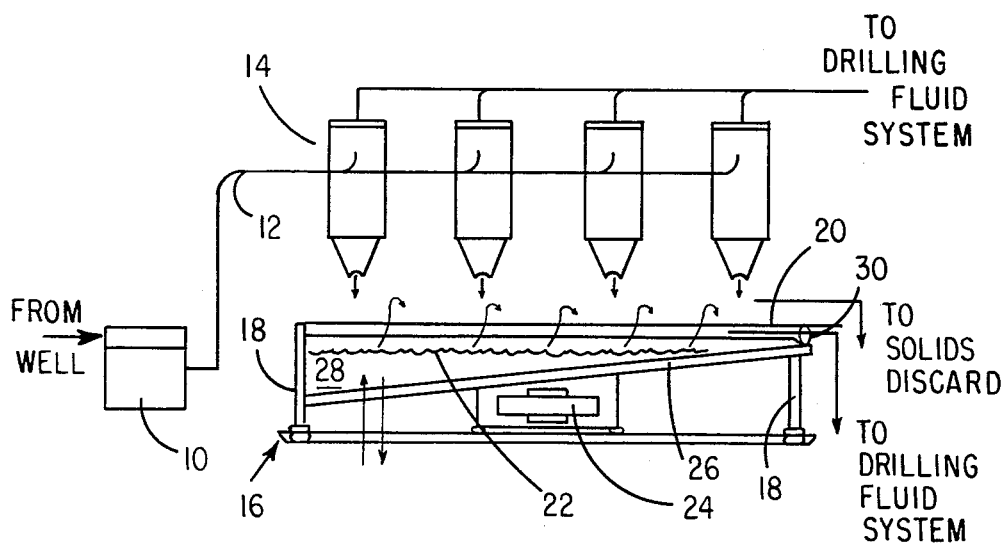
FIG. 2 is a skematic drawing of a drilling fluid cleaning system including the present invention.

As shown in FIG. 2, the drilling fluid, which can be water base, oil base or emulsified fluid, is withdrawn from a well and is introduced into a shale shaker. The drilled solids which do not pass through the screens are discarded. The drilling fluid, containing some very small sized drilled solids, passes through the screen and is transferred by a conduit 12 into a plurality of centrifugal separation devices 14. The effluent of the devices 14 includes the liquid components of the drilling fluid, which are to be returned to the drilling fluid system. The more dense components of the drilling fluid fall from the underside of the devices 14 and are introduced onto a screen separation device 16.

Figure 3:
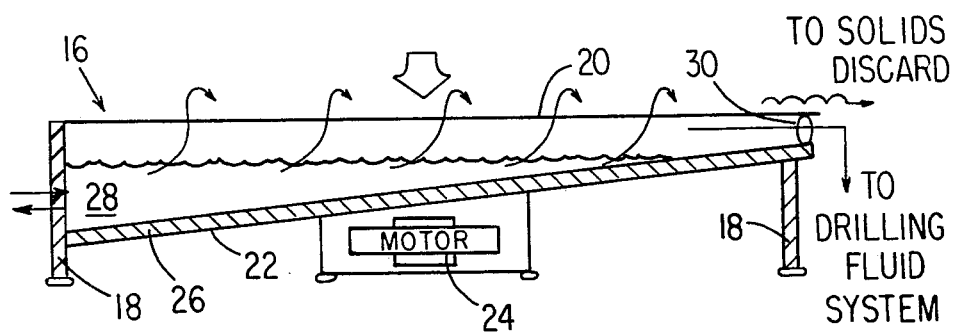
FIG. 3 is a skematic drawing showing one embodiment of the present invention.
Figure 4:
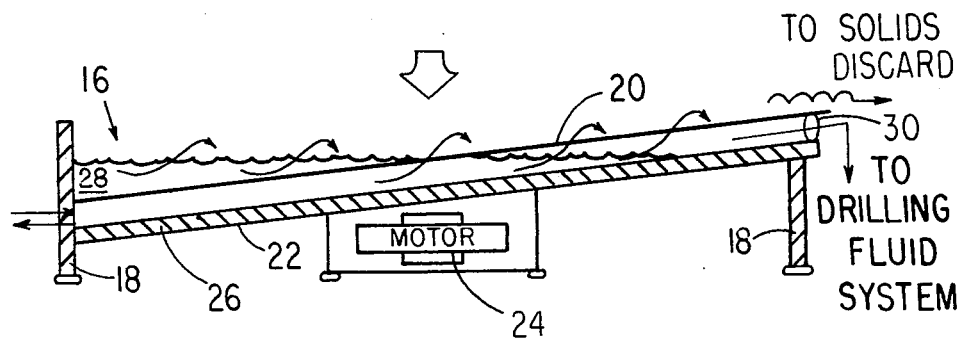
FIG. 4 is a skematic drawing showing an alternate embodiment of the present invention.

One embodiment of the screen separation device 16 made in accordance with the present invention has a frame 18 and a screen 20. The screen 20 either rectangular or circular, with a mesh size of about 100–150 ASTM mesh is mounted to an upper rim portion of the frame 18. A pan or tray 22 is attached to the frame 18 directly below the screen 20. A vibratory motor device 24 is mounted to the frame 18 and is attached to the underside of the tray 22. The vibratory motor device 24 may be an electrical motor or any other device which generates vibratory motion. The vibratory motor device 24 may be connected to the sides of the tray 22. Also, the sides of the frame 18 may extend above the level of the screen 20 and the vibratory motor device 24 may be mounted to the frame 18 above the level of the screen 20. A bottom panel 26 of the tray 22 is inclined at an angle between about zero to about five degrees. As shown in FIGS. 3 and 4, the bottom panel 26 may be inclined or both the screen 20 and the panel 26 may be inclined.

Within the tray 22 is contained a body of liquid 28, such as an aqueous liquid, preferably water. A small gap or opening 30 is provided at the point of juncture of the screen 20 and the upper portion of the tray 22. The screen 20 may be mounted to the frame 18 separately from the tray 22 and may also be vibrated separately by any suitable vibration means, including a second vibratory motor device 24. The vibratory motor device 24 imparts a periodic motion or oscillation at a given frequency to both the tray 22 and the screen 20. Depending upon the vibratory motor device 24 utilized, the motion may be reciprocal, gyrating, circular, spiral or combination of these. The vibratory motion is designed to move solid material particles across the surface of the screen and along the bottom panel 26 of the tray 22 in a single direction or out to the periphery thereof.

After the more dense components of the drilling fluid have been introduced onto the screen 20, the screen 20 may be vibrated to aid in the separation of the drilled solids from the remaining components of the drilling fluid. By vibrating the screen 20, the drilled solids which cannot pass through the screen 20 are moved across the surface thereof and are discarded. The tray 22 is vibrated by the vibratory motor device 24 which causes the aqueous liquid to be splashed or thrown upwards through the screen 20 and onto the drilled solids thereon. The aqueous liquid splashes onto the drilled solids and provides mobility to pass any small sized material or liquid through the screen 20 and are collected in the tray 22.

When used on an unweighted drilling system, the viscosifier, such as bentonite of the drilling fluid is adhered to the drilled solids and is difficult to remove by vibration alone. The splashing of the aqueous liquid from the tray 22 separates the viscosifier from the drilled solids while on the screen 20 and carries the viscosifier down into the body of aqueous liquid 28 in the tray 22. The viscosifier and any other material present may thereafter be returned to the drilling fluid system, directed for additional treating, or discarded.

When used on a weighted drilling fluid, the weighting material, such as barite, and the viscosifier adheres tightly to the drilling solids. The aqueous liquid splashes up through the screen 20 and aids in the separation of the weighting material from the drilling solids. The weighting material which is finer than the screen openings passes through the screen 20 and collects in the tray 22. The weighting material has a high density. For example, barite has a specific gravity of 4.2 while drilled solids and bentonite have a specific gravity of about 2.6. The differences in the densities of the materials aids in the separation of the weighting material from the aqueous liquid present in the tray 22. The same vibration of the tray 22 which causes the splashing of the aqueous liquid also causes the weighting material to collect on the bottom panel 26 of the tray 22. The pattern of vibration of the tray 22 is designed to cause the weighting material and other solids to move along the bottom panel 26, through the aqueous liquid 28 and through the opening 30, as shown in FIGS. 3 and 4. After exiting the tray 22, the weighting material and other solids are returned to the drilling fluid system. The aqueous liquid is rejuvenated to prevent a detrimental increase in viscosity by filtration to remove collected debris and silt or may be discarded and replaced by a new body of aqueous liquid 28. Also, a circulation of aqueous liquid may be provided to pass through the tray 22 and return to the mud system.

Figure 5:
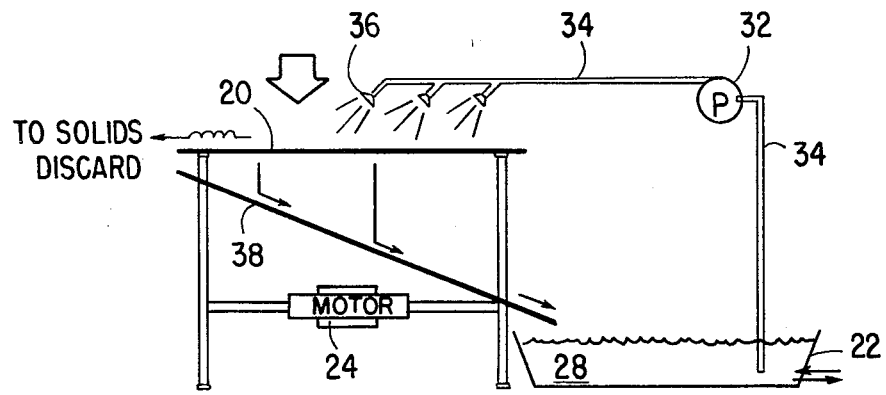
FIG. 5 is a skematic drawing showing an alternate embodiment of the present invention.
Figure 6:
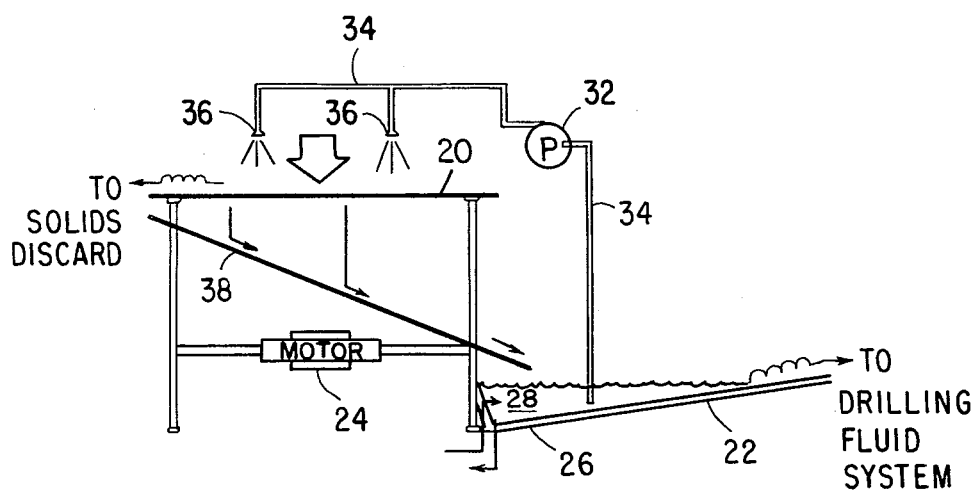
FIG. 6 is a skematic drawing showing an alternate embodiment of the present invention.

Alternate embodiments of the present invention are shown in FIGS. 5 and 6. In the embodiments of FIGS. 5 and 6, the tray 22 is separately mounted from the screen 20. The tray 22 may be mounted on a lower level than the screen 20, or may be mounted on the same level. The aqueous liquid contained in the tray 22 is withdrawn by a pump 32 through a conduit 34 and is sprayed onto the screen 20 through a plurality of spray nozzles 36. The spray nozzles 36 are directed towards the screen 20 and may be spaced above or below the screen 20 to aid in the separation of the drilled solids from the other material present thereon. The aqueous liquid sprayed onto the screen 20 is collected in a trough 38, connected to the frame 18 spaced beneath the screen 20, and reintroduced to the tray 22 by gravity flow or by a secondary pump (not shown) if the screen 20 and the tray 22 are on the same level. The embodiment of the present invention shown in FIG. 5 can be utilized for both an unweighted and weighted drilling system but the tray 22 is not vibrated. FIG. 6 illustrates an embodiment wherein the tray 22 is vibrated to aid in the separation of weighting material from the aqueous liquid in the tray 22. The weighting material is to be returned to the drilling fluid system.

The present invention provides a drilling fluid cleaning method and apparatus which does not introduce large quantities of liquid into the drilling fluid system. In fact, when the invention is utilized for cleaning a weighted drilling fluid, very little additional water is added to the drilling fluid system from this cleaning method as has been described above.

The vibrating tray 22 (FIG. 2) may be positioned under a portion of the vibrating screen 20. In particular, where a screening device has two or more screens positioned such that the solids collected on the first screen are caused to move over a second screen, the pan is commonly positioned under the second screen.

To illustrate the effectiveness of the present invention in reducing the amount of weighting material lost with discarded drill solids, the following example is provided.

EXAMPLE

A vibrating screen device was constructed to test the effectiveness of the present invention in reducing loss of weighting material. Two screens were spaced horizontally adjacent each other. Each screen was 14"×21" and of a screen size to make a cut at 150 microns (DX 100). A plurality of hydrocyclones were positioned above the first screen. A tray containing a body of liquid was positioned under the second screen in accordance with the present invention. The screens and the tray were vibrated and the dense components from the hydrocyclones were introduced onto the first screen. The material from the hydrocyclones which did not pass through the first screen was transported by vibratory motion onto the second screen. As described herein, the liquid within the tray splashed upwards through the second screen and onto the material thereon. The material consisted of drill solids and some barite. Samples were taken of the material that was passed from the first to the second screen and from the material that was passed from the second screen to discard. The samples showed that only 20% of the barite passed through the first screen and 80% was passed to the second screen. This indicates that 80% of the barite would be discarded or returned to the drilling fluid system along with large amounts of drill solids. The samples taken from the second screen showed that only 1% of the barite thereon did not pass through the second screen and would be discarded. This clearly indicates the superior barite loss characteristics by splashing liquid from a body of liquid as in accordance with the present invention.

The present invention may be utilized in any other industrial application where a separation of different size solid materials is required without the use of large quantities of liquids or chemicals to aid in such separation, and to reduce the separation loss of small size solid materials.

Whereas the present invention as been described in particular relation to the drawings attached hereto, it should be understood that other and further modifications apart from those shown or suggested herein, may be made within the scope and spirit of this invention.

I claim:

1. An apparatus for removal of oversize solids from an aqueous liquid having oversize and undersize solids therein, comprising:
    a frame having a liquid retention tray attached thereto, the liquid retention tray including an inclined bottom panel and an exit opening adjacent an upper portion of the liquid retention tray and above a predetermined liquid level of the liquid retention tray;
    a screen attached to the frame above the liquid retention tray and said exit opening; and
    vibratory means connected to the frame for imparting vibratory motion to the liquid retention tray and the screen to (a) allow undersize solids to pass through the screen to the liquid retention tray and move the oversized solids across the surface of the screen for passage over an end thereof, (b) move a portion of the undersized solids across the inclined bottom panel of the liquid retention tray for passage through the exit opening, and (c) splash liquid within the liquid retention tray upward through said screen and onto any solids on the surface of the screen.

2. An apparatus of claim 1 wherein the screen is inclined.

3. An apparatus of claim 2 wherein a portion of the screen is spaced below the predetermined liquid level of the liquid retention tray.

4. An apparatus of claim 1 and including spray means to convey a portion of the liquid in the liquid retention tray onto any solids on the surface of the screen.

* * * * *